United States Patent [19]
Takahashi

[11] 3,944,882
[45] Mar. 16, 1976

[54] CENTERING CIRCUITS EMPLOYED FOR BEAM DEFLECTION CIRCUITS

[75] Inventor: Shigenori Takahashi, Yokohama, Japan

[73] Assignee: Sony Corporation, Tokyo, Japan

[22] Filed: Oct. 7, 1974

[21] Appl. No.: 512,905

[30] Foreign Application Priority Data
Oct. 11, 1973  Japan............................ 48-118138

[52] U.S. Cl. ............................................. 315/398
[51] Int. Cl.² .......................................... H01J 29/70
[58] Field of Search ................................. 315/398

[56] References Cited
UNITED STATES PATENTS

| | | | |
|---|---|---|---|
| 2,637,832 | 5/1953 | Rogers | 315/398 |
| 2,646,527 | 7/1953 | Mathes | 315/398 |
| 2,953,679 | 9/1960 | Rush et al. | 315/398 X |
| 3,489,948 | 1/1970 | Buechel | 315/398 |

*Primary Examiner*—Malcolm F. Hubler
*Attorney, Agent, or Firm*—Lewis H. Eslinger; Alvin Sinderbrand

[57] ABSTRACT

A centering circuit employed for a deflection circuit having a series connection of a deflection coil and a capacitor for deflecting an electron beam in a cathode ray tube, which comprises a coil connected at one end thereof to a connecting point between the deflection coil and the capacitor, a pair of diodes connected at their respective one ends in parallel with opposite polarity to the other end of the coil and a potentiometer connected between the respective other ends of the pair of diodes and having a movable tap connected to a reference potential terminal. The potentiometer controls respective currents flowing through the pair of diodes with the movement of the movable tap to vary the average value of current flowing through the coil. The deflection coil is supplied with a centering current varying in accordance with the average value of the current flowing through the coil.

5 Claims, 14 Drawing Figures

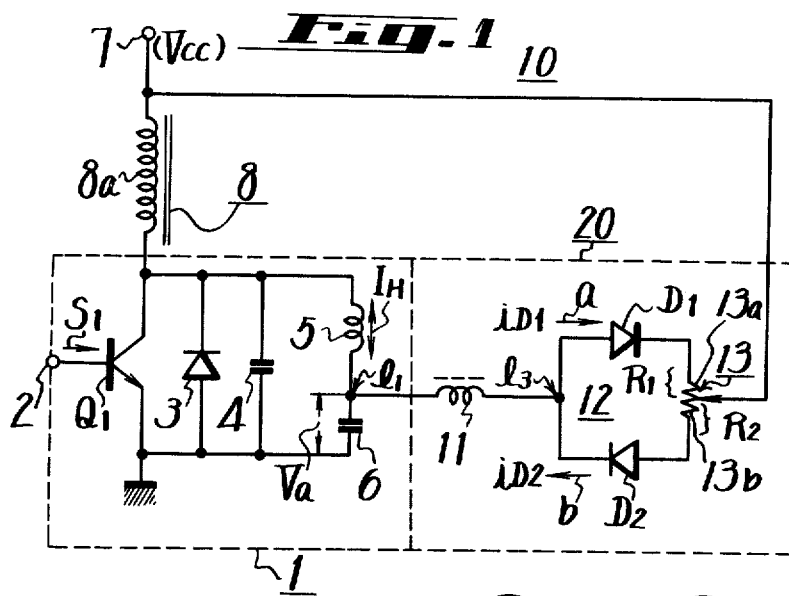

3,944,882

CENTERING CIRCUITS EMPLOYED FOR BEAM DEFLECTION CIRCUITS

BACKGROUND OF THE INVENTION

1. Field of the Invention

This invention generally relates to beam deflection circuits for cathode ray tubes, and more particularly is directed to an improvement in centering circuits employed for the beam deflection circuit.

2. Description of the Prior Art

In display devices utilizing a cathode ray tube, such as television receivers, in which a beam deflection circuit is provided for deflecting an electron beam in the cathode ray tube to produce a raster on a screen of the tube, it is required to move or shift the position of the raster on the screen in order to center a picture on the screen. To meet this requirement, a centering circuit which usually works in cooperation with the beam deflection circuit is provided in the display device.

There have been proposed several centering circuits employed for, for example, a horizontal deflection circuit of the television receiver. The prior art centering circuit previously proposed is composed of a variable resistor acting to control a centering current flowing through a horizontal deflection coil for centering the picture on the screen and a switch device connected to switch the direction of the centering current, and supplies to the horizontal deflection coil with the centering current having a direction selected by the switch device in response to the direction of shift of the raster and a value controlled by the variable resistor in response to the amount of shift of the raster in the horizontal direction. Such a centering circuit as mentioned above, however, has a disadvantage that it is relatively troublesome to set the raster at an appropriate position because of selecting the direction and controlling the value of the centering current. Further, in this case, the value of the centering current is controlled by the variable resistor, so that the power dissipated in the variable resistor is relatively much.

SUMMARY OF THE INVENTION

In centering circuits employed for beam deflection circuits according to the present invention, the centering current supplied to the deflection coil is easily controlled both in direction and value without providing a switch device for selecting the current direction and without dissipating much power.

It is an object of the present invention to provide an improved centering circuit avoiding the above mentioned disadvantages inherent in prior art circuits.

Another object of the present invention is to provide an improved centering circuit to be employed for a horizontal deflection circuit of a television receiver to shift a picture on a screen for centering in the line scanning direction.

A further object of the present invention is to provide an improved centering circuit for a television receiver which permits controllers of the television receiver to easily achieve the centering of a picture on a screen.

Other objects, features and advantages of the present invention will be apparent from the following description taken in conjunction with the accompaning drawings.

BRIEF DESCRIPTION OF THE DRAWINGS

FIG. 1 is a schematic circuit diagram showing one example of centering circuits according to the present invention.

FIG. 2A–2E, 3A–3D and 4A–4D, inclusive, are schematic waveform diagrams used for explanation of the operation of the circuit shown in FIG. 1.

DESCRIPTION OF THE PREFERRED EMBODIMENT

Figure 2A:
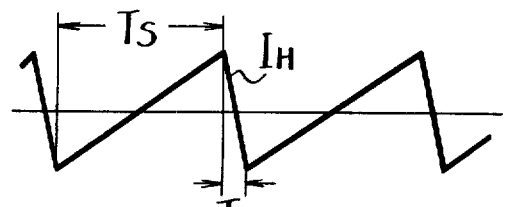

With reference to FIG. 1, a horizontal deflection circuit, which includes a centering circuit according to the present invention, will be hereinbelow described. In FIG. 1, reference numeral 10 generally indicates the horizontal deflection circuit and 1 an output stage including a horizontal deflection coil. The horizontal output stage 1 comprises a horizontal output transistor $Q_1$ whose base electrode is connected to an input terminal 2. A driving signal $S_1$, based upon a signal (pulse signal) synchronized with the horizontal period of a video signal produced by a horizontal oscillator (though not shown), is applied to the input terminal 2 to control the the conductivity of transistor $Q_1$.

Between the collector and emitter electrodes of the transistor $Q_1$, there are connected a damper diode 3, a capacitor 4 for resonance, and a series connection of a horizontal coil 5 and a capacitor 6 for sawtooth waveform control, respectively. An operating voltage (whose voltage value is taken as V$cc$) for the horizontal output stage 1 is applied from a DC voltage source terminal 7 to the collector electrode of the transistor $Q_1$ through a coil 8a which forms a horizontal output transformer 8.

Figure 2B:
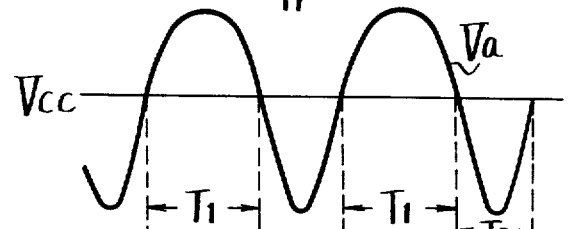

Thus, in response to ON and OFF operations of the transistor $Q_1$, a sawtooth waveform current $I_H$ shown in FIG. 2A flows through the horizontal deflection coil 5, and a parabolic waveform voltage $V_a$ shown in FIG. 2B is produced across the sawtooth waveform control capacitor 6.

In the present invention with the horizontal deflection circuit 10 described as above, a centering circuit 20 is provided between a connection point $l_1$ of the horizontal deflection coil 5 and the capacitor 6 and the voltage source terminal 7. The centering circuit 20 consists of a coil 11 whose one end is connected to the connection point $l_1$ and a centering current controlling part 12 connected between the other end $l_3$ of the coil 11 and the voltage source terminal 7. The centering current controlling part 12 includes a pair of diodes $D_1$ and $D_2$ which are connected with opposite polarities. One electrodes of the diodes $D_1$ and $D_2$ opposing the coil 11 are connected together at $l_3$ and to the coil 11 and the other electrodes thereof or opposing the voltage source terminal 7 are connected to the voltage source terminal 7 through a variable impedance element such as a potentiometer 13 in the illustrated embodiment.

Figure 2C:
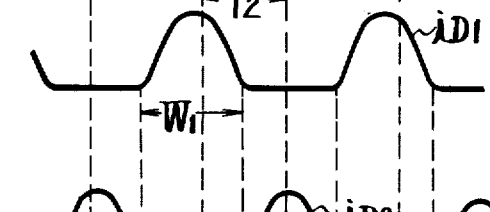

A description will be now given on a centering adjustment of the horizontal deflection circuit 10 which the centering circuit 20 constructed as above. If a movable tap of the potentiometer 13 rests at the center of its resistor as shown in FIG. 1, the resistance value $R_1$ of a resistor 13a of the potentiometer 13 at the side of the diode $D_1$ is equal to the resistance value $R_2$ of a resistor 13b of the potentiometer 13 at the side of the diode $D_2$ ($R_1=R_2$). While, the relationship between the source voltage V$cc$ (for example, 130V) and the voltage V$a$ across the sawtooth waveform controlling capacitor 6 is shown in FIG. 2B so that, during a time interval $T_1$ between times $t_1$ and $t_2$ (similarly between times $t_3$ and $t_4$), a forward voltage is applied across only the diode $D_1$ to make the same conductive (ON). As a result, a current $i_{D1}$ shown by an arrow $a$ in FIG. 1 and also shown in FIG. 2C flows to the diode $D_1$ through the coil 11. In fact, since the coil 11 exists in the current path thereof, a time at when the current $i_{D1}$ starts its flowing or the diode $D_1$ becomes ON is delayed from the time $t_1$ to $t'_1$. Similarly, a time at when the diode $D_1$ becomes non-conductive (OFF) is delayed from $t_2$ to $t'_2$.

Figure 2D:
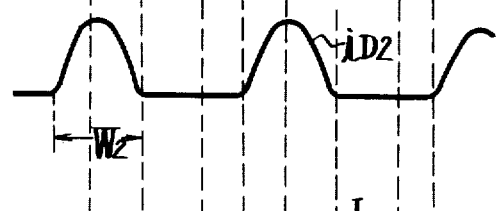

On the other hand, during a time interval $T_2$ between the times $t_2$ and $t_3$, the voltage $Va$ across the capacitor 6 becomes lower than the source voltage $Vcc$ so that only the diode $D_2$ becomes ON. As a result, a current $i_{D2}$ (refer to FIG. 2D) flows through the diode $D_2$ in the direction shown by an arrow $b$ in FIG. 1. In this case, the current $i_{D2}$ is equal in value to the current $i_{D1}$ substantially.

Figure 2E:
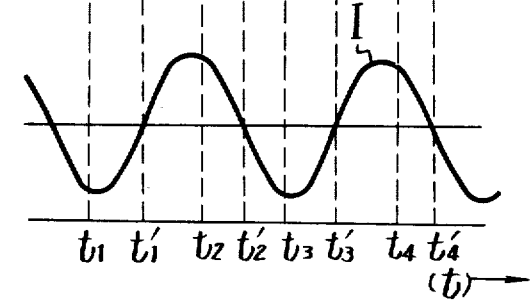

Therefore, a composite current of the currents $i_{D1}$ and $i_{D2}$ flows through the coil 11 and is shown in FIG. 2E by a symbol I during the time intervals $T_1$ and $T_2$. In this case, the currents $i_{D1}$ and $i_{D2}$ composing the current I which flows through the coil 11 are reverse to each other in direction but equal in current value, so that their average value is zero and a DC voltage corresponding to fluctuations of the currents $i_{D1}$ and $i_{D2}$ is not applied to the connection point $l_1$ between the horizontal deflection coil 5 and the capacitor 6. Consequently, no centering current flows through the horizontal deflection coil 5 and hence the raster is not moved. Accordingly, even if a position of the raster is previously shifted from the center of the screen to, for example, the right, the raster remains as it is. In such a case, in order to shift the position of the raster, the movable tap of the potentiometer 13 is adjusted in position to make its resistance value satisfy a condition, for example, $R_1 < R_2$ and a centering current is supplied to the horizontal deflection coil 5 from the coil $8a$ of the output transformer 8 to the connection point $l_1$ to thereby move the position of the raster to the left. This will be now described. When the potentiometer 13 is so adjusted that the condition $R_1 < R_2$ is satisfied, for example, $R_1$ being zero but $R_2$ being maximum, the time intervals within which the diodes $D_1$ and $D_2$ are ON are controlled as a reason described later. Let it assumed that the conduction time intervals of the diodes $D_1$ and $D_2$ are taken as $W_1$ and $W_2$, respectively. When the resistance values $R_1$ and $R_2$ are equal, $W_1 = W_2$ is satisfied. However, when the resistance Value $R_1$ is smaller than that $R_2$ as in the above case, the conduction time interval $W_1$ of the diode $D_1$ becomes longer than that $W_2$ of the diode $D_2$ ($W_1 > W_2$) and the currents $i_{D1}$ and $i_{D2}$ becomes to satisfy the condition $i_{D1} > i_{D2}$. Thus, in this example, currents $i_{D1}$ and $i_{D2}$ shown in FIGS. 3B and 3C flow through the diodes $D_1$ and $D_2$, and consequently a current I shown in FIG. 3D flows through the coil 11. Thus, an average value of the current I does not become zero and a centering current flows to the horizontal deflection coil 5 from the output transformer 8 to the connection point $l_1$ to move the position of the raster to the left.

In this case, the peak value of the current I flowing through the coil 11 is suppressed at its maximum value due to the coil 11 so that the current I becomes substantially equal to that I shown in FIG. 2E flowing through the coil 11 where $R_1 = R_2$ is satisfied.

The reason why the conduction time intervals $W_1$ and $W_2$ of the diodes $D_1$ and $D_2$ are controlled with the resistance values $R_1$ and $R_2$, mentioned as previously, will be now described.

Now, if the resistance value $R_1$ is made low, the current $i_{D1}$ can flow more easily through the diode $D_1$. In this case, the impedance of the coil 11 is dominant as compared with the resistance value $R_1$. If the voltage drop across the resistor $R_1$ and the forward voltage drop across the diode $D_1$ are both neglected, a voltage $e$ applied across the centering circuit 20 can be expressed as follows.

$$e = L \cdot \frac{di_{D1}}{dt}$$

where L represents an inductance of the coil 11.

During the time interval $T_1$ shown in FIG. 3, a voltage higher than the source voltage Vcc is applied to the end of the coil 11 near the connection point $l_1$, so that the condition $$L \cdot \frac{di_{D1}}{dt} > 0$$

is established. Thus, the current $i_{D1}$ is kept to increase. But, at the time $t_2$ or the termination of the time $T_1$, $$L \cdot \frac{di_{D1}}{dt} = 0,$$

so that the current $i_{D1}$ becomes maximum at that time $t_2$. However, since after the time $t_2$ a voltage lower than the source voltage Vcc is applied to the end of the coil 11 near the connection point $l_1$, the condition $$L \cdot \frac{di_{D1}}{dt} < 0$$

is satisfied. As a result, the current $i_{D1}$ starts to be decreased. For this reason, the current $i_{D1}$ can flow even if the voltage $e$ applied across the centering circuit 20 becomes negative (during the time interval $T_2$), so that the current $i_{D1}$ in this case can be shown in FIG. 3B.

The above operation can be, in turn, considered as that a part of the energy stored in the sawtooth waveform controlling capacitor 6 is transmitted between the capacitor 6 and the coil 11. That is, when $$L \cdot \frac{di_{D1}}{dt} > 0,$$

the energy is transmitted from the capacitor 6 to the coil 11, while when $$L \cdot \frac{di_{D1}}{dt} < 0,$$

the energy transmitted to the coil 11 returns to the capacitor 6.

Let it is considered that the resistance value $R_1$ is made great. During the time interval within which $$L \cdot \frac{di_{D1}}{dt} > 0$$

is held, an energy to be transmitted from the capacitor 6 to the coil 11 is consumed by the resistor 13a, while during the time interval within which $$L \cdot \frac{di_{D1}}{dt} < 0$$

is held, the energy transmitted to the coil 11 is consumed again by the resistor 13a. Consequently, when the resistance value $R_1$ of the resistor 13a is made great, the energy transmitted between the capacitor 6 and the coil 11 is attenuated rapidly. This will be considered on the diode $D_1$. The diode $D_1$ is made OFF rapidly as compared with the case when the resistance value $R_1$ is small. At the same time, the maximum value of the current $i_{D1}$ is limited by the resistor 13a.

Therefore, if the potentiometer 13 is adjusted to satisfy the condition $R_1 < R_2$, the conduction time interval $W_1$ of the diode $D_1$ is made longer than that $W_2$ of the diode $D_2$ and the condition $i_{D1} > i_{D2}$ is established with the result that the current waveforms shown in FIGS. 3B to 3D can be obtained. Thereby, the raster is moved to the left. In this case, by adjusting the potentiometer 13 in accordance with a shift of the raster position, the raster can be positioned at the center of the screen to perform the centering adjustment.

Figure 4A:
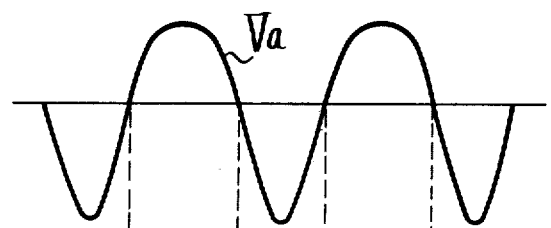
Figure 4B:
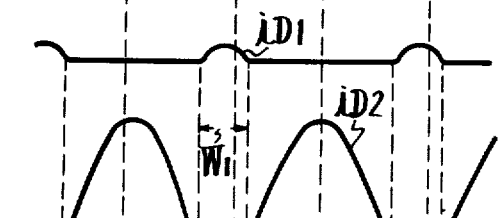
Figure 4C:
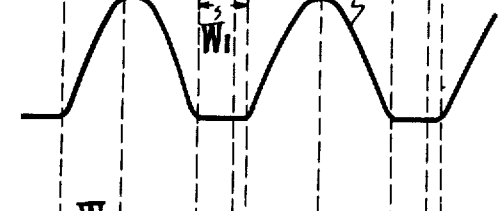
Figure 4D:
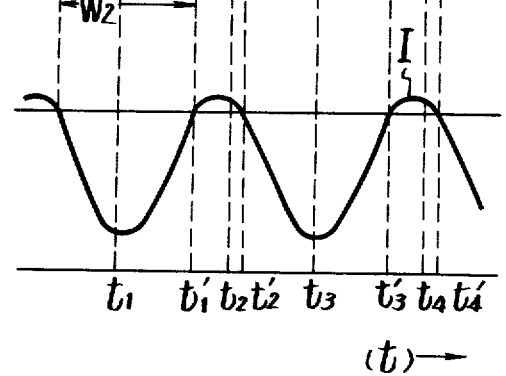

While, if the potentiometer 13 is adjusted to satisfy the condition $R_1 > R_2$, an operation reverse to that mentioned above is carried out to move the raster to the right and current waveforms at this case are shown in FIGS. 4B to 4D.

As may be obvious from the above description, the centering circuit 20 of the present invention can be made very simple in circuit construction as shown in FIG. 1. In this case, the condition time intervals $W_1$ and $W_2$ of the diodes $D_1$ and $D_2$ can be controlled by adjusting the potentiometer 13, so that the raster can be moved only by adjusting the potentiometer 13. Therefore, according to the present invention, the adjustment of the centering can be easily achieved as compared with the prior art.

Further, the centering circuit 20 of the present invention is formed of the potentiometer 13, the pair of diodes $D_1$ and $D_2$, and the coil 11 as described previously. The peculiar effects attained by the centering circuit 20 with the coil 11 will be described as follows.

In the case that the coil 11 is omitted or the connection point $l_1$ is connected directly to the connection point $l_3$ between the diodes $D_1$ and $D_2$, even if the potentiometer 13 is adjusted, it does not control the conduction time intervals $W_1$ and $W_2$ of the diodes $D_1$ and $D_2$, but controls the currents flowing through the diodes $D_1$ and $D_2$. Therefore, it is required that the resistance value of the potentiometer 13 is selected to be large, for example, about $1 \sim 2$ KΩ for achieving the adjustment of centering. As a result, power consumption increases, and in addition voltages in reverse directions for the diodes $D_1$ and $D_2$ become high (for example, $60 \sim 100$V) due to high resistance value of the potentiometer 13, which results in that the diodes $D_1$ and $D_2$ must be diodes of high withstanding voltage. Further, if diodes with bad recovery characteristics in the reverse directions are used as the diodes $D_1$ and $D_2$, there may be a fear that loss may be caused by reverse currents and consequently the diodes $D_1$ and $D_2$ are damaged. In addition, the moving distance of the raster becomes different in the left and right directions to deteriorate a so-called horizontal linearity.

However, with the present invention in which the coil 11 is inserted between the connection points $l_1$ and $l_3$, the following advantages are effected.

(1) Since the conduction time intervals $W_1$ and $W_2$ of the diodes $D_1$ and $D_2$ can be controlled without changing the peak to peak value of current flowing through the coil 11, the potentiometer 13 with small resistance value (about 100Ω) is enough. Thus, power consumption is small and the efficiency is high.

(2) Since the resistance value of the potentiometer 13 can be made small, voltages of reverse directions applied to the diodes $D_1$ and $D_2$ are small (for example, about $10 \sim 20$V, in the illustrated embodiment) when the diodes $D_1$ and $D_2$ are in OFF-state. Therefore, diodes with low withstanding voltage can be used as the diodes $D_1$ and $D_2$.

(3) And, with the horizontal deflection circuit which has provided with the centering circuit according to the present invention, the conduction time intervals $W_1$ and $W_2$ of the diodes $D_1$ and $D_2$ can be continuously changed by the potentiometer 13, so that the raster is continuously moved in response thereto and the moving amount of the raster is equal in the left and right directions from the center of the screen. For this reason, any deterioration in the horizontal linearity caused by centering adjustment is avoided or the horizontal linearity can be made free from influence.

In place of the potentiometer 13, another element such as a variable inductance element can be used as the variable impedance element. In such a case, a plurality of taps may be provided on the variable inductance element to switch its inductance.

The above description is given on only one preferred embodiment of the present invention, but it may be apparent that many modifications and variations could be effected by those skilled in the art without departing from the spirits and scope of the novel concepts of the present invention.

I claim as my invention

1. A circuit arrangement for use in connection with a cathode ray tube comprising:
   a. a deflection coil for deflecting an electron beam in the cathode ray tube;
   b. a capacitor connected in series to said deflection coil;
   c. means connected between a pair of reference potential terminals for supplying a deflection current of substantially sawtoothed waveform to said deflection coil;
   d. inductance means with one end connected to a connecting point between said deflection coil and said capacitor;
   e. a pair of diodes with respective one ends connected to the other end of said inductance means so as to dispose both diodes in parallel with opposite polarity; and
   f. variable impedance means having a controllable terminal, said variable impedance means being connected between the respective other ends of said pair of diodes and said controllable terminal being connected to one of said reference potential terminals.

2. A circuit arrangement according to claim 1, wherein said inductance means comprises a coil connected between the connecting point between said deflection coil and said capacitor and a connecting point between said pair of diodes.

3. A circuit arrangement according to claim 2, wherein said variable impedance means comprises a potentiometer connected between said pair of diodes, a movable tap of said potentiometer being connected one of said reference potential terminals.

4. A circuit arrangement according to claim 3, wherein said means for supplying the deflection current includes an output coil, one end of said deflection coil being connected to said output coil so as to form a series connection of said output coil, said deflection coil and said capacitor between said pair of reference potential terminals.

5. A circuit arrangement according to claim 4, wherein said movable tap of the potentiometer is connected to the reference potential terminal where one end of said output coil is connected to.

* * * * *